Figure 1:
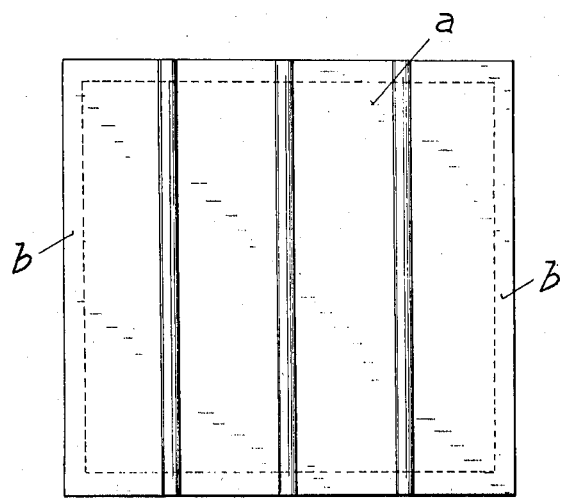

Nov. 10, 1931.  H. BECKMANN  1,831,406
RUBBER DIAPHRAGM
Filed Sept. 3, 1926

Inventor:
Hermann Beckmann by  Kuichatter

Atty.

Patented Nov. 10, 1931

1,831,406

UNITED STATES PATENT OFFICE

HERMANN BECKMANN, OF BERLIN-ZEHLENDORF, GERMANY

RUBBER DIAPHRAGM

Application filed September 3, 1926, Serial No. 133,463, and in Germany August 22, 1924.

My invention refers to rubber diaphragms and more especially to a diaphragm adapted for use as a separator in electric primary or secondary cells, electrolytic cells, filters and the like.

In a prior and copending application, Serial No. 40,953, filed July 1, 1925 (now Patent No. 1,745,657), I have described and claimed certain new rubber substances and processes of making the same. The present application is directed more particularly to diaphragms or separators for storage batteries and the like, for which my new substances are particularly suited and adapted.

A diaphragm or separator in order to be highly efficient must have as fine pores as possible, in order to be able to prevent minute particles from passing through. It is further necessary that the number of pores per unit of surface be as great as possible in order to obtain a low electrical resistance. It is further necessary that a diaphragm or separator be highly resistive against chemical and electrolytic actions.

There are known separators made of hard rubber, in which are imbedded short cotton threads serving for the conduction of the current. However, the pores thus formed in the rubber substance are not sufficiently minute to permanently and satisfactorily prevent the transference of small particles, the less so since the cotton threads invariably separate out after some time. There are further known separators having the form of hard rubber tubes with a great number of very narrow slits. Such separators, while being capable of preventing the transference of fine particles and being resistive against electrolytic action, have been found to offer to the current a comparatively high resistance. Other separators have been suggested consisting of spongy collodion having minute pores and a low electrical resistance and low permeability for minute particles. However, collodion has proved to be insufficiently inert, chemically, inasmuch as the cellulose forming part thereof is readily decomposed on the positive side. The same is true of the small wooden plates nowadays in use as separators for accumulators and the like.

The diaphragm or separator according to the present invention has proved superior to all products mentioned above. It consists of a porous rubber product produced as a gel by the coagulation of latex, or other rubber solution, this gel being traversed by an infinite number of pores of such fineness that they can be said to be of colloidal dimensions. By the term "colloidal dimensions" I mean of the order of magnitude of particles in colloidal solutions, that is ranging from submicroscopic up to particles visible in a microscope. A product of this kind can be obtained for instance in the manner described in my acknowledged copending application, Serial No. 40,953. In said application I describe processes for the production of suitable storage battery separators. These processes can be briefly described as comprising methods of aggregating the rubber particles of a rubber solution to the stage of formation of a reticulous jelly whereof the interaggregate pores are of microscopically visible, filter size and occupied by the solvent liquid; curing the said jelly while the said liquid remains interstitially included, without the addition of any substances which might cause the reticulous structure to be deformed or enlarged and thereby fixing the rubber body in same said reticulous structure adapted to the filtration of liquids. A porous rubber product of this kind has the outer appearance of dense solid rubber and a separator made from such product will retain also the smallest particles, while presenting only a very low resistance to the electric current and to the exchange of liquids, being extremely resistive against the destructive action of most chemicals and having considerable flexibility.

A rubber diaphragm as above described is also highly suitable for use as a filter. A highly porous product, when used as a separator can also be impregnated in such manner, that, if mounted in a lead accumulator it will exert a favorable action similar to that of the impregnated wooden boards hitherto in use. To this end the rubber diaphragm or separator can be impregnated with extract of wood, phenol or the like. A separator of this kind can assume any suitable form and may for instance wholly or partly envelop the electrode.

In case a separator of this kind should lack in mechanical strength, I prefer providing it with reinforcing ribs, edges, frames, grids or the like made of solid hard rubber, the diaphragm or separator proper being attached to or embedded in these reinforcing members. I produce such reinforced diaphragm or separator by immersing the reinforcing member or members, while they are still unvulcanized or only partly vulcanized, in the latex either before or after the latter has been converted into a jelly, the combined product being finally vulcanized as a whole.

Figure 2:
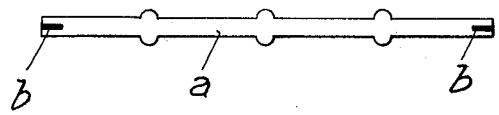

In the drawings affixed to this specification and forming part thereof a reinforced separator is illustrated diagrammatically by way of example, Fig. 1 being a front elevation and Fig. 2 an end view. In the drawings $a$ is a porous rubber plate of the kind described above, while $b, b$ is a rectangular hard rubber frame embedded in the porous rubber plate.

Various changes may be made in the details of the operation and particularly in the proportions of the ingredients present in the solutions used without departing from the invention or sacrificing the advantages thereof.

I claim:—

1. As a new article of manufacture, a rubber diaphragm and separator for electric and electrolytic cells and filters, comprising a porous rubber product produced from a vulcanized latex coagulum, such product being traversed by an infinite number of extremely fine pores of colloidal size and which are invisible to the naked eye, the pores being filled with a liquid capable of exerting a favorable effect on the negative electrodes of lead accumulators.

2. As a new article of manufacture, a rubber diaphragm adapted for use as a separator in electric storage batteries and the like, comprising a vulcanized rubber gel body of substantially undeformed reticulate structure permeated by pores of substantially colloidal dimensions, which are substantially uniform both in size and in distribution, the said gel body having considerable flexibility.

3. As a separator for electric storage batteries and the like, the structure of claim 2 reinforced by a supporting structure of hard rubber imbedded in said gel body.

4. As a separator for electric storage batteries and the like, the structure of claim 2 reinforced by a supporting structure of hard rubber, vulcanized in place.

5. As a new article of manufacture, a rubber diaphragm adapted for use as a separator in electric storage batteries, comprising a vulcanized rubber gel body of substantially undeformed reticulate structure permeated by pores of substantially colloidal dimensions, which are substantially uniform both in size and in distribution, the said gel body being reinforced by a structure of hard rubber imbedded therein and the pores being filled with a liquid capable of exerting a favorable effect on the negative electrodes of said storage batteries.

In testimony whereof I affix my signature.

HERMANN BECKMANN.